US012531340B2

(12) United States Patent
Huang et al.

(10) Patent No.: US 12,531,340 B2
(45) Date of Patent: Jan. 20, 2026

(54) ANTENNA SYSTEM

(71) Applicant: Wistron NeWeb Corp., Hsinchu (TW)

(72) Inventors: Chin-Lien Huang, Hsinchu (TW); Chun-Jui Pan, Hsinchu (TW); Kuo-Jen Lai, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 156 days.

(21) Appl. No.: 18/503,281

(22) Filed: Nov. 7, 2023

(65) Prior Publication Data

US 2024/0186700 A1 Jun. 6, 2024

(30) Foreign Application Priority Data

Dec. 6, 2022 (TW) ................................ 111146660

(51) Int. Cl.
*H01Q 1/38* (2006.01)
*H01Q 5/371* (2015.01)
*H01Q 15/14* (2006.01)

(52) U.S. Cl.
CPC ............. *H01Q 5/371* (2015.01); *H01Q 15/14* (2013.01)

(58) Field of Classification Search
CPC ........... H01Q 1/24; H01Q 1/38; H01Q 15/14; H01Q 5/37; H01Q 5/371
See application file for complete search history.

(56) References Cited

U.S. PATENT DOCUMENTS

| | | | | |
|---|---|---|---|---|
| 5,554,995 | A * | 9/1996 | Jun | H01Q 21/065 343/846 |
| 7,352,326 | B2 * | 4/2008 | Korva | H01Q 1/243 343/702 |
| 7,903,035 | B2 * | 3/2011 | Mikkola | H01Q 9/0442 343/702 |
| 9,270,028 | B2 * | 2/2016 | Ruvinsky | H01Q 5/371 |
| 10,218,085 | B2 * | 2/2019 | Huang | H01Q 9/42 |
| 10,749,267 | B2 * | 8/2020 | Sone | H01Q 9/065 |
| 11,211,697 | B2 * | 12/2021 | Yun | H01Q 9/0442 |
| 11,355,847 | B2 * | 6/2022 | Fang | H01Q 5/25 |

FOREIGN PATENT DOCUMENTS

TW 200820488 A 5/2008

* cited by examiner

*Primary Examiner* — Tho G Phan
(74) *Attorney, Agent, or Firm* — McClure, Qualey & Rodack, LLP

(57) ABSTRACT

An antenna system includes a signal feeding element, a first transmission line, a second transmission line, a first antenna element, a second antenna element, and a reflective plane. The first antenna element includes a first radiation element and a second radiation element. The second antenna element includes a third radiation element and a fourth radiation element. Each of the first radiation element, the second radiation element, the third radiation element, and the fourth radiation element includes a main branch, a first branch, and a second branch. The main branch has a first end and a second end. The first branch is coupled to the first end of the main branch. The second branch is coupled to the second end of the main branch. A slot region is surrounded by the main branch, the first branch, and the second branch.

19 Claims, 10 Drawing Sheets

ANTENNA SYSTEM

CROSS REFERENCE TO RELATED APPLICATIONS

This application claims priority of Taiwan Patent Application No. 111146660 filed on Dec. 6, 2022, the entirety of which is incorporated by reference herein.

BACKGROUND OF THE INVENTION

Field of the Invention

The disclosure generally relates to an antenna system, and more particularly, to an antenna system with high radiation gain.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHZ, and 5.8 GHz.

Antennas are indispensable elements for wireless communication. If an antenna used for signal reception and transmission has insufficient radiation gain, it will negatively affect the communication quality of the mobile device in which it is installed. Accordingly, it has become a critical challenge for designers to design a small-size antenna structure with high radiation gain.

BRIEF SUMMARY OF THE INVENTION

In an exemplary embodiment, the invention is directed to an antenna system that includes a signal feeding element, a first transmission line, a second transmission line, a first antenna element, a second antenna element, and a reflective plane. The first antenna element is coupled through the first transmission line to the signal feeding element. The first antenna element includes a first radiation element and a second radiation element. The second antenna element is coupled through the second transmission line to the signal feeding element. The second antenna element includes a third radiation element and a fourth radiation element. The reflective plane is adjacent to the first antenna element and the second antenna element. Each of the first radiation element, the second radiation element, the third radiation element, and the fourth radiation element includes a main branch, a first branch, and a second branch. The main branch has a first end and a second end. The first branch is coupled to the first end of the main branch. The second branch is coupled to the second end of the main branch. A slot region is surrounded by the main branch, the first branch, and the second branch.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
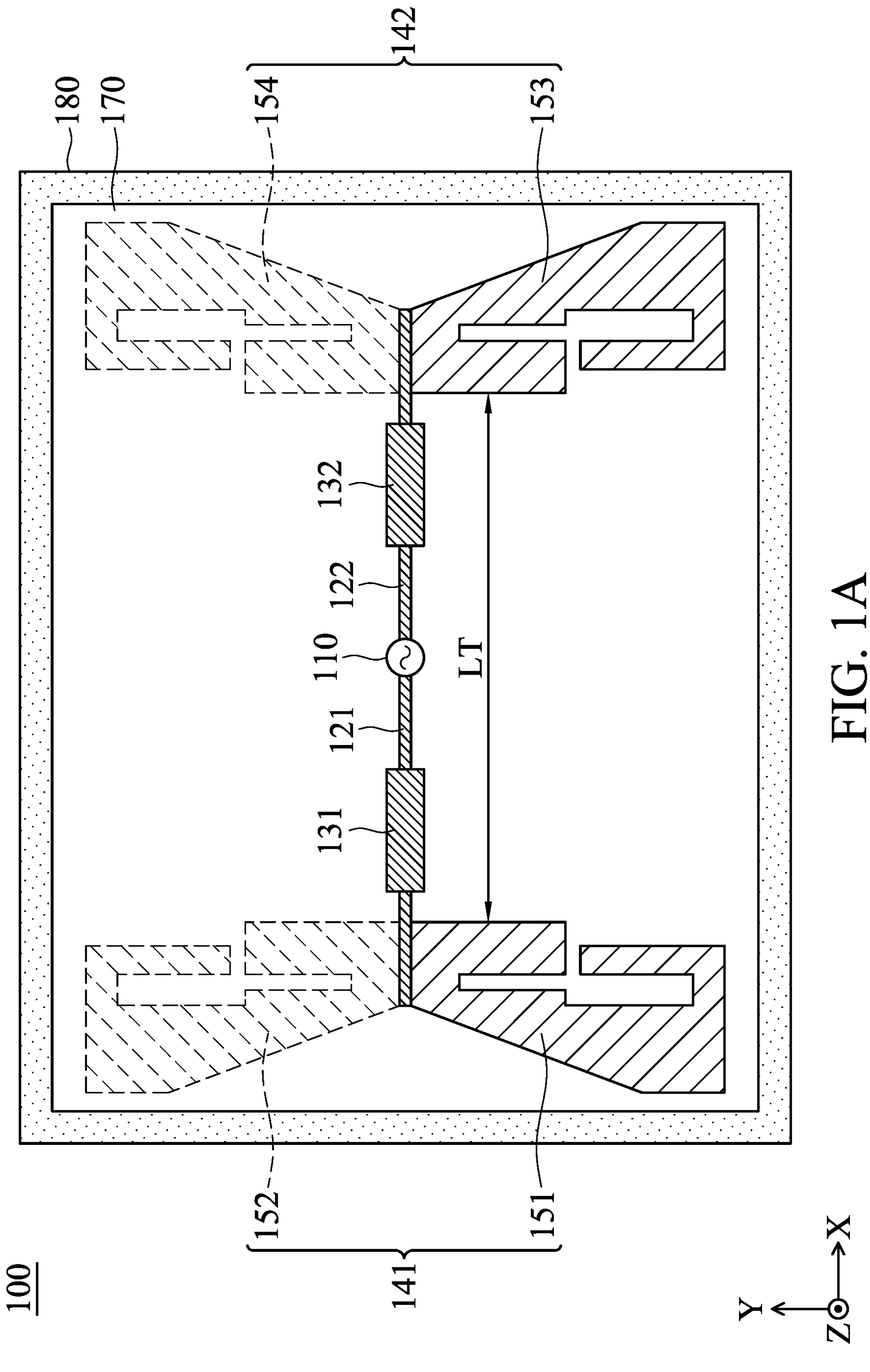
FIG. 1A is a front view of an antenna system according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
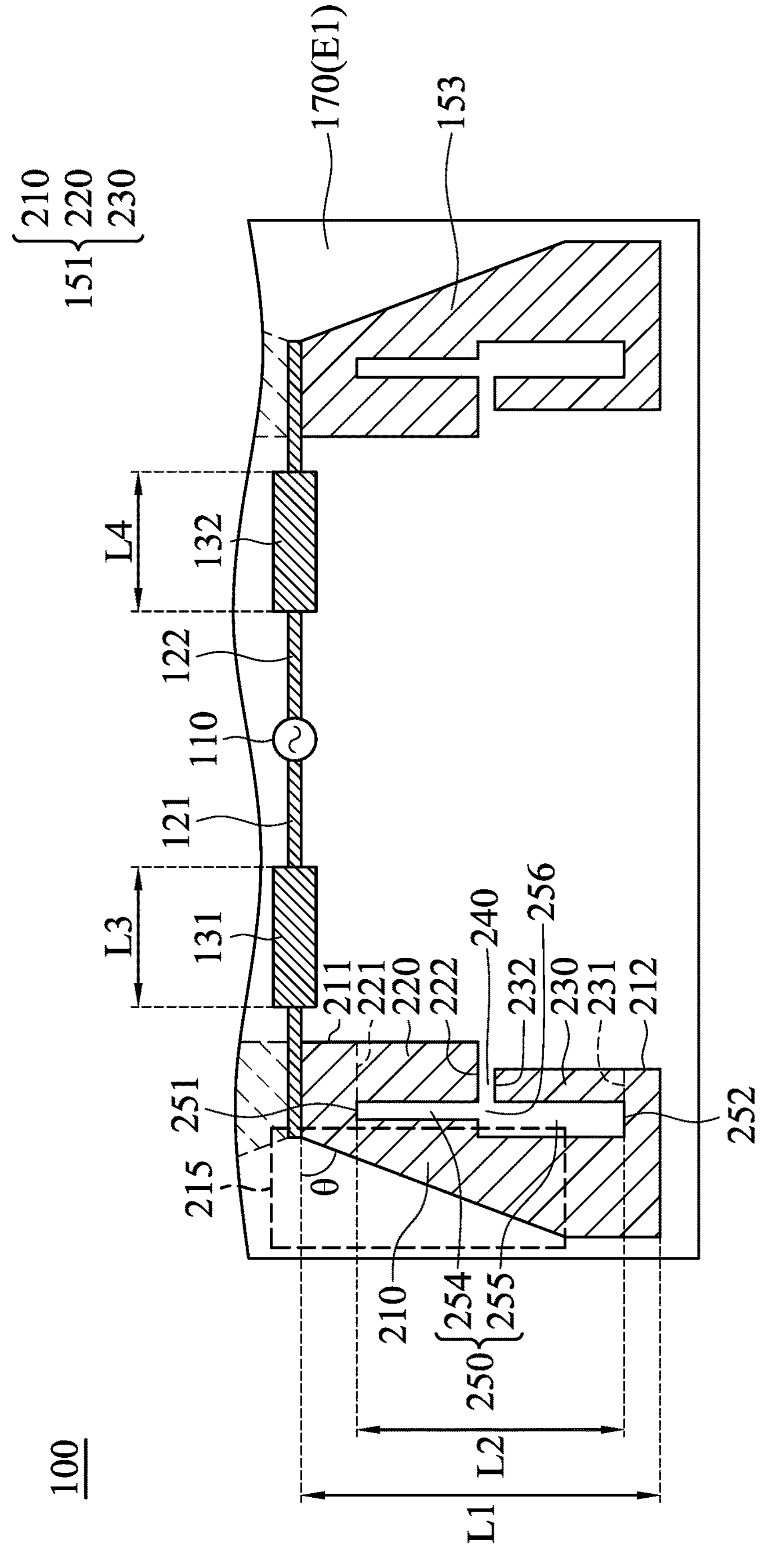
FIG. 1B is a partial view of an antenna system according to an embodiment of the invention.
Figure 1C:
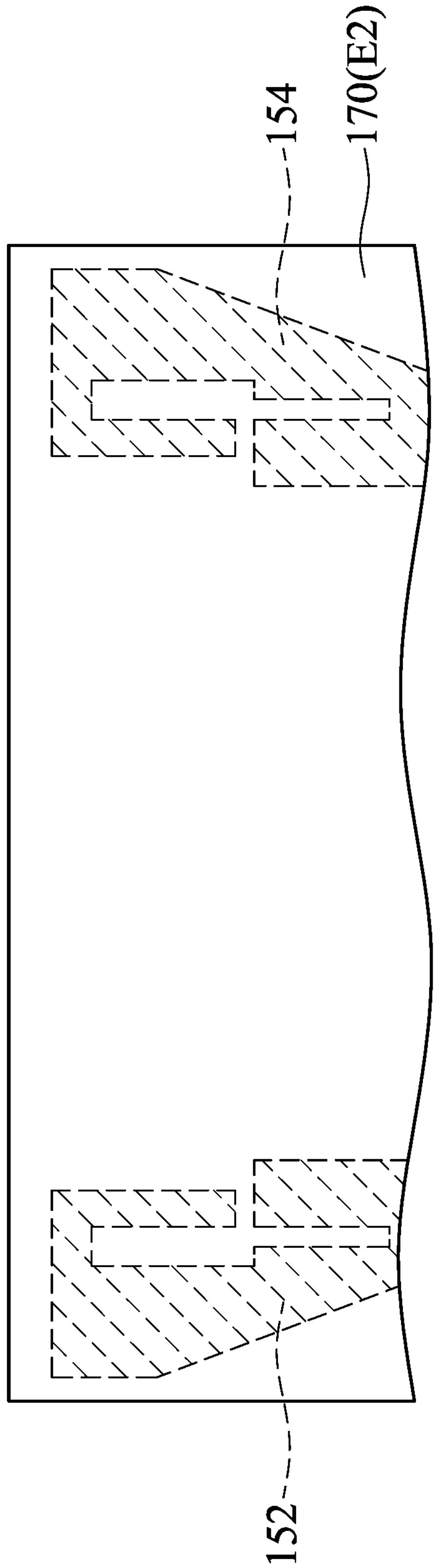
FIG. 1C is another partial view of an antenna system according to an embodiment of the invention.
Figure 1D:
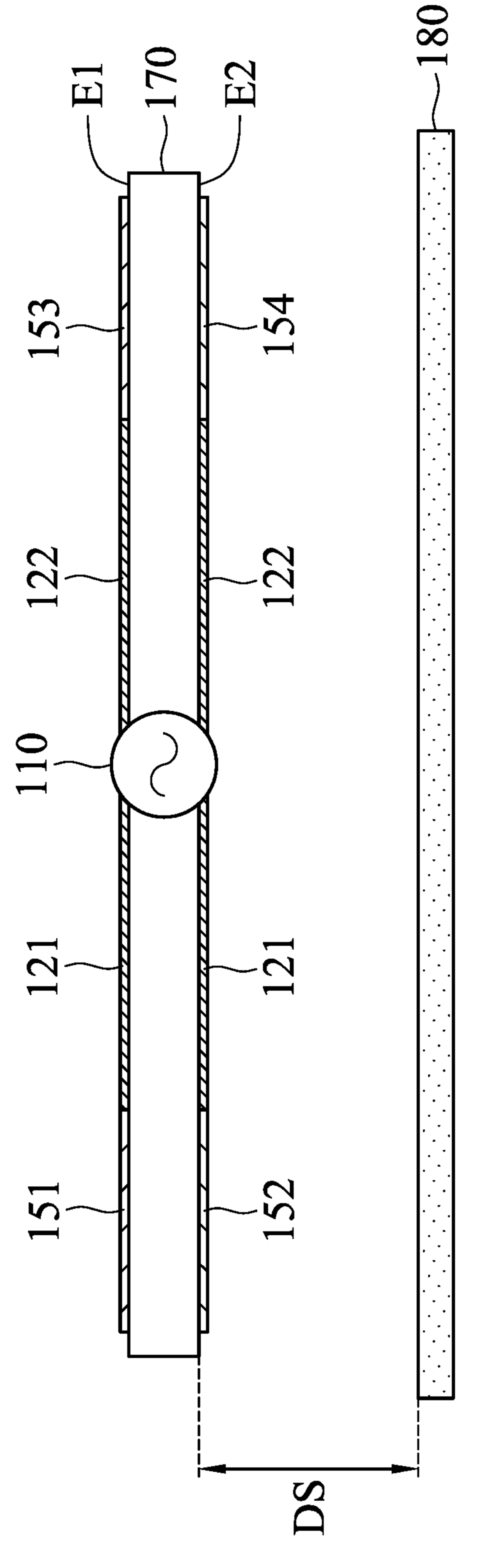
FIG. 1D is a side view of an antenna system according to an embodiment of the invention.

FIG. 1A is a front view of an antenna system 100 according to an embodiment of the invention. FIG. 1B is a partial view of the antenna system 100 according to an embodiment of the invention. FIG. 1C is another partial view of the antenna system 100 according to an embodiment of the invention. FIG. 1D is a side view of the antenna system 100 according to an embodiment of the invention. Please refer to FIG. 1A, FIG. 1B, FIG. 1C, and FIG. 1D together. For example, the antenna system 100 may be applied in a drone or a wireless access point, but it is not limited thereto. In the embodiment of FIG. 1A, FIG. 1B, FIG. 1C, and FIG. 1D, the antenna system 100 at least includes a signal feeding element 110, a first transmission line 121, a second transmission line 122, a first antenna element 141, a second antenna element 142, and a reflective plane 180. The first transmission line 121, the second transmission line 122, the first antenna element 141, the second antenna element 142, and the reflective plane 180 may all be made of metal materials, such as copper, silver, aluminum, iron, or their alloys.

The signal feeding element 110 may be implemented with one or more feeding metal elements. For example, the signal feeding element 110 may be coupled to an RF (Radio Frequency) module (not shown) for exciting the antenna system 100.

Each of the first transmission line 121 and the second transmission line 122 may substantially have a straight-line shape. For example, each of the first transmission line 121 and the second transmission line 122 may be implemented with a microstrip line, but it is not limited thereto. In some embodiments, the first transmission line 121 includes a first widening segment 131, and the second transmission line 122 includes a second widening segment 132.

The first antenna element 141 is coupled through the first transmission line 121 to the signal feeding element 110. The first antenna element 141 includes a first radiation element 151 and a second radiation element 152. In some embodiments, the second radiation element 152 is symmetrical to the first radiation element 151. That is, the second radiation element 152 is considered as a mirrored image of the first radiation element 151. The second antenna element 142 is coupled through the second transmission line 122 to the signal feeding element 110. The second antenna element 142 includes a third radiation element 153 and a fourth radiation element 154. In some embodiments, the fourth radiation element 154 is symmetrical to the third radiation element 153. That is, the fourth radiation element 154 is considered as a mirrored image of the third radiation element 153.

In some embodiments, the antenna system 100 further includes a dielectric substrate 170. Specifically, the dielectric substrate 170 has a first surface E1 and a second surface E2 which are opposite to each other. The first radiation element 151 and the third radiation element 153 are disposed on the first surface E1 of the dielectric substrate 170. The second radiation element 152 and the fourth radiation element 154 are disposed on the second surface E2 of the dielectric substrate 170. Furthermore, the first transmission line 121 and the second transmission line 122 are distributed over the first surface E1 and the second surface E2 of the dielectric substrate 170. However, the invention is not limited thereto. In alternative embodiments, the first transmission line 121, the second transmission line 122, the first antenna element 141, and the second antenna element 142 as mentioned above are merely disposed on the same surface of the dielectric substrate 170 (not shown). It should be understood that the dielectric substrate 170 is merely an optional element, which is omitted in other embodiments.

The reflective plane 180 is adjacent to the first antenna element 141 and the second antenna element 142, and it is configured to reflect the electromagnetic waves from the first antenna element 141 and the second antenna element 142, thereby increasing the radiation gain of the antenna system 100. In some embodiments, the reflective plane 180 is separate from the dielectric substrate 170, and they are substantially parallel to each other. In addition, the whole vertical projections of the first antenna element 141 and the second antenna element 142 may be inside the reflective plane 180. It should be noted that the term "adjacent" or "close" over the disclosure means that the distance (spacing) between two corresponding elements is smaller than a predetermined distance (e.g., 15 mm or the shorter), or means that the two corresponding elements directly touch each other (i.e., the aforementioned distance/spacing between them is reduced to 0).

In some embodiments, each of the first radiation element 151, the second radiation element 152, the third radiation element 153, and the fourth radiation element 154 includes a main branch 210, a first branch 220, and a second branch 230. The first radiation element 151 will be exemplary and illustrated as follows. It should be understood that the other radiation elements have identical or symmetrical structures, and they will not be illustrated again herein.

The main branch 210 may substantially have a C-shape. Specifically, the main branch 210 has a first end 211 and a second end 212. The first end 211 of the main branch 210 is coupled through the first transmission line 121 or the second transmission line 122 to the signal feeding element 110. In some embodiments, the main branch 210 belongs to a variable-width design. For example, the main branch 210 may include a cutting retraction portion 215, and an acute angle θ may be formed between the cutting retraction portion 215 and the first transmission line 121 or the second transmission line 122. However, the invention is not limited thereto. In alternative embodiments, the main branch 210 is modified to an equal-width design.

The first branch 220 may substantially have a relatively wide straight-line shape. Specifically, the first branch 220 has a first end 221 and a second end 222. The first end 221 of the first branch 220 is coupled to the first end 211 of the main branch 210. The second end 222 of the first branch 220 is an open end.

The second branch 230 may substantially have a relatively narrow straight-line shape (in comparison to the first branch 220). Specifically, the second branch 230 has a first end 231 and a second end 232. The first end 231 of the second branch 230 is coupled to the second end 212 of the main branch 210. The second end 232 of the second branch 230 is an open end. For example, the second end 232 of the second branch 230 and the second end 222 of the first branch 220 may substantially extend toward each other. In some embodiments, a notch 240 is formed between the first branch 220 and the second branch 230.

A slot region 250 is surrounded by the main branch 210, the first branch 220, and the second branch 230. For example, the slot region 250 may substantially have a variable-width straight-line shape. Specifically, the slot region 250 has a first closed end 251 and a second closed end 252, which are away from each other. In some embodiments, the slot region 250 includes a narrow portion 254 adjacent to the first closed end 251 and a wide portion 255 adjacent to the second closed end 252. In addition, the aforementioned notch 240 may be exactly connected to the junction point 256 of the narrow portion 254 and the wide portion 255 of the slot region 250. However, the invention is not limited thereto. In alternative embodiments, the slot region 250 substantially has an equal-width straight-line shape, and the position of the notch 240 is adjustable according to different requirements.

Figure 2:
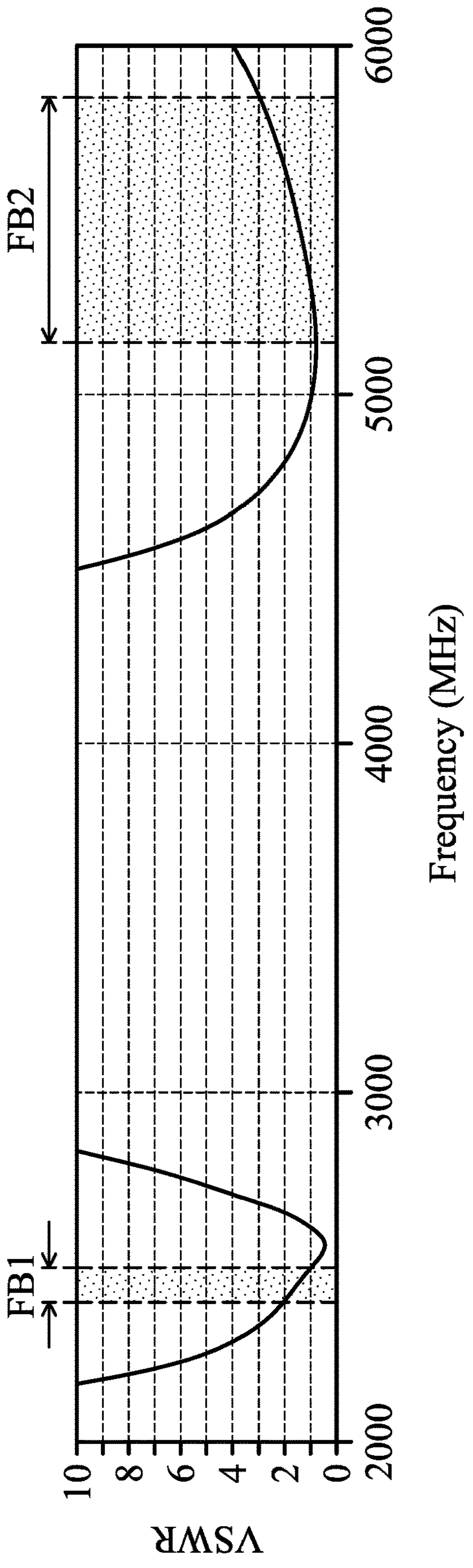
FIG. 2 is a diagram of VSWR (Voltage Standing Wave Ratio) of an antenna system according to an embodiment of the invention.

FIG. 2 is a diagram of VSWR (Voltage Standing Wave Ratio) of the antenna system 100 according to an embodiment of the invention. The horizontal axis represents the operational frequency (MHz), and the vertical axis represents the VSWR. According to the measurement of FIG. 2, the antenna system 100 can cover a first frequency band FB1 and a second frequency band FB2. For example, the first frequency band FB1 may be from 2400 MHz to 2500 MHz, and the second frequency band FB2 may be from 5150 MHz to 5850 MHz. Therefore, the antenna system 100 can support at least the wideband operations of WLAN (Wireless Local Area Network) 2.4 GHz/5 GHz.

In some embodiments, the operational principles of the antenna system 100 will be described as follows. Among each of the first radiation element 151, the second radiation element 152, the third radiation element 153, and the fourth radiation element 154, the main branch 210 is excited to generate the aforementioned first frequency band FB1, the slot region 250 is excited to generate the aforementioned second frequency band FB2, and the first branch 220 is configured to fine-tune the impedance matching of the aforementioned second frequency band FB2. In addition, the first widening segment 131 and the second widening segment 132 are also configured to fine-tune the impedance matching of the aforementioned second frequency band FB2.

In some embodiments, the element sizes of the antenna system 100 will be described as follows. The length L1 of the main branch 210 may be substantially equal to 0.25 wavelength (λ/4) of the first frequency band FB1 of the antenna system 100. The length L2 of the slot region 250 may be substantially equal to 0.5 wavelength (λ/2) of the second frequency band FB2 of the antenna system 100. The total length LT of the first transmission line 121 and the second transmission line 122 may be substantially equal to 0.5 wavelength (λ/2) of the first frequency band FB1 of the antenna system 100. The length L3 of the first widening segment 131 may be from 5 mm to 8 mm. The length L4 of the second widening segment 132 may be from 5 mm to 8 mm. The specific distance DS between the reflective plane 180 and the dielectric substrate 170 may be shorter than 0.125 (λ/8) of the first frequency band FB1 of the antenna system 100. For example, the aforementioned specific distance DS may be from 12 mm to 13 mm, but it is not limited thereto. The acute angle θ may be from 50 to 90 degrees. The above ranges of element sizes are calculated and obtained according to many experiment results, and they help to optimize the operational bandwidth and impedance matching of the antenna system 100.

The following embodiments will introduce different configurations and detailed structural features of the antenna system 100. It should be understood that these figures and descriptions are merely exemplary, rather than limitations of the invention.

Figure 3:
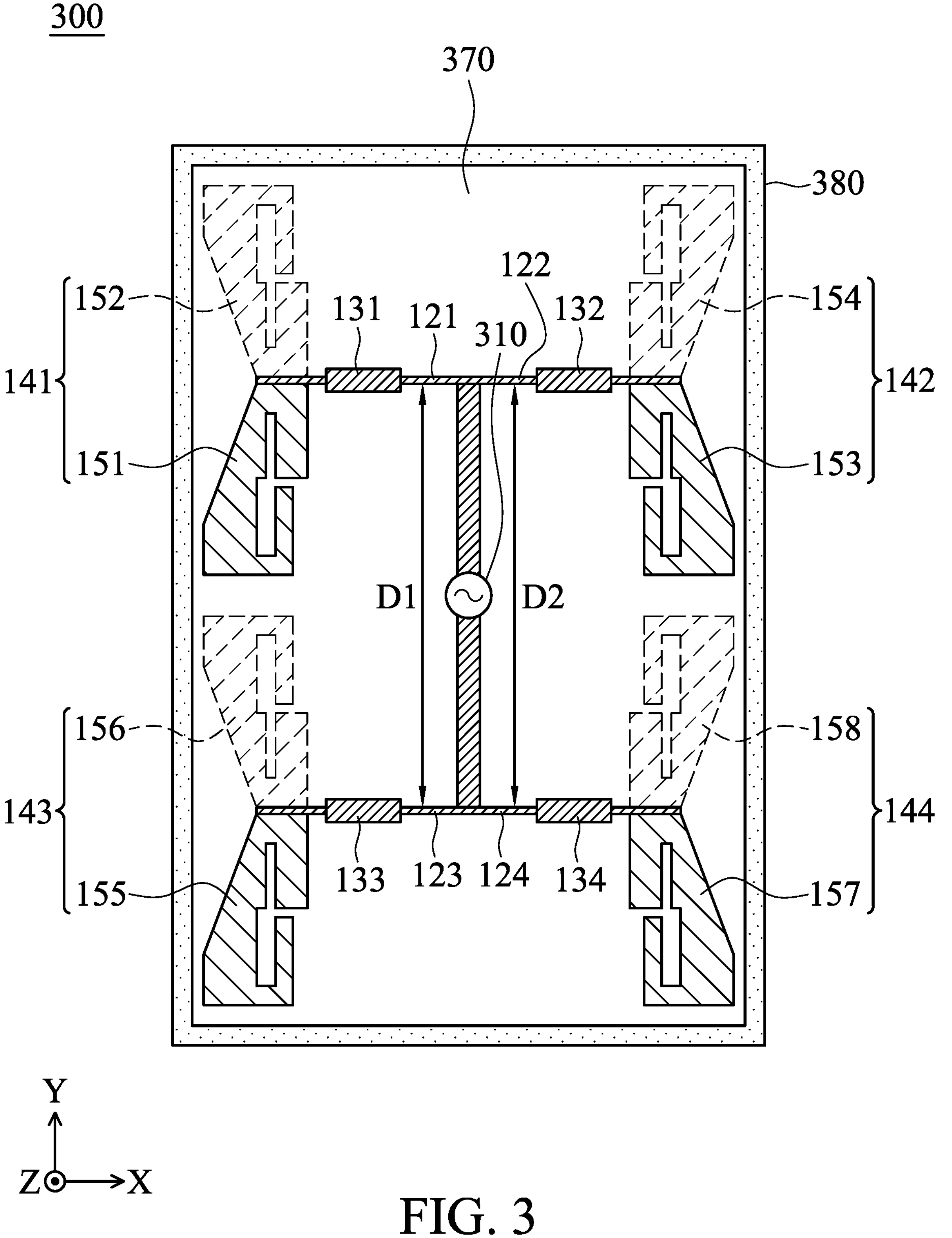
FIG. 3 is a front view of an antenna system according to an embodiment of the invention.

FIG. 3 is a front view of an antenna system 300 according to an embodiment of the invention. FIG. 3 is similar to FIG. 1A, FIG. 1B, FIG. 1C, and FIG. 1D. In the embodiment of FIG. 3, the antenna system 300 further includes a third transmission line 123, a fourth transmission line 124, a third antenna element 143, and a fourth antenna element 144. The third transmission line 123 may be substantially parallel to the first transmission line 121. The fourth transmission line 124 may be substantially parallel to the second transmission line 122. In addition, the third transmission line 123 may include a third widening segment 133, and the fourth transmission line 124 may include a fourth widening segment 134. The third antenna element 143 is coupled through the third transmission line 123 to a signal feeding element 310. The third antenna element 143 includes a fifth radiation element 155 and a sixth radiation element 156. The fourth antenna element 144 is coupled through the fourth transmission line 124 to the signal feeding element 310. The fourth antenna element 144 includes a seventh radiation element 157 and an eighth radiation element 158. A dielectric substrate 370 of the antenna system 300 has a first surface and a second surface which are opposite to each other. The first radiation element 151, the third radiation element 153, the fifth radiation element 155, and the seventh radiation element 157 may all be disposed on the first surface of the dielectric substrate 370. The second radiation element 152, the fourth radiation element 154, the sixth radiation element 156, and the eighth radiation element 158 may all be disposed on the second surface of the dielectric substrate 370. A reflective plane 380 of the antenna system 300 are adjacent to the first antenna element 141, the second antenna element 142, the third antenna element 143, and the fourth antenna element 144. In some embodiments, the signal feeding element 310 of the antenna system 300 further has an impedance adjustment design, but it is not limited thereto.

Figure 4:
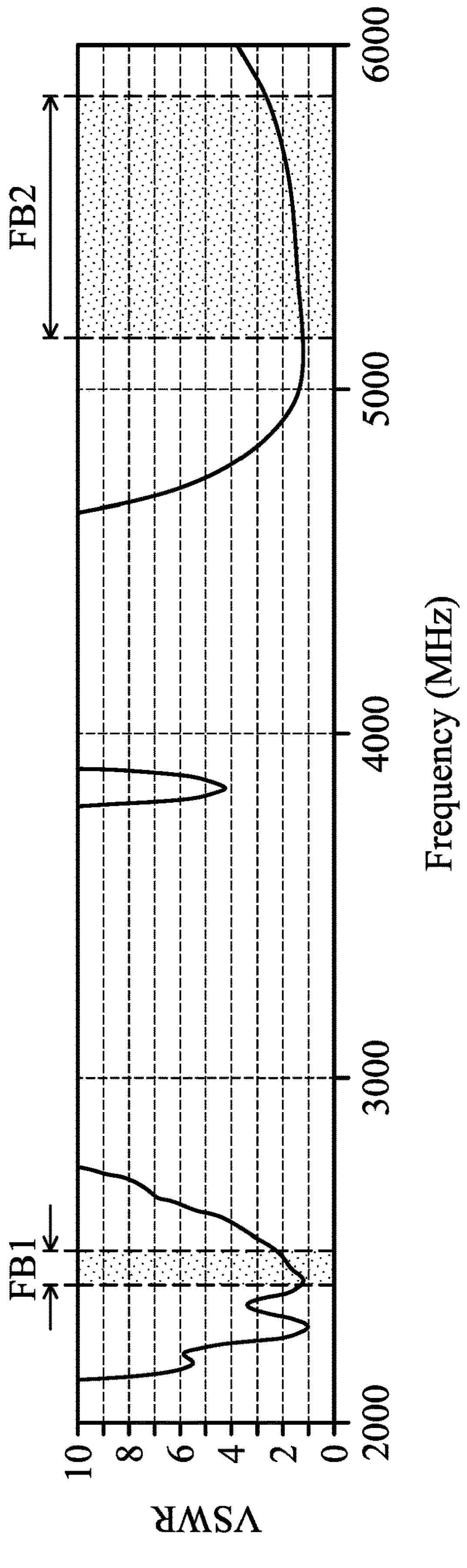
FIG. 4 is a diagram of VSWR of an antenna system according to an embodiment of the invention.

FIG. 4 is a diagram of VSWR of the antenna system 300 according to an embodiment of the invention. The horizontal axis represents the operational frequency (MHz), and the vertical axis represents the VSWR. According to the measurement of FIG. 4, the antenna system 300 can also cover the first frequency band FB1 and the second frequency band FB2 as mentioned above, so as to support at least the wideband operations of WLAN 2.4 GHz/5 GHz. In some embodiments, a first distance D1 is defined between the third transmission line 123 and the first transmission line 121, and a second distance D2 is defined between the fourth transmission line 124 and the second transmission line 122. Each of the first distance D1 and the second distance D2 may be from 0.5 to 0.75 wavelength (λ/2~3λ/4) of the aforementioned first frequency band FB1.

Figure 5:
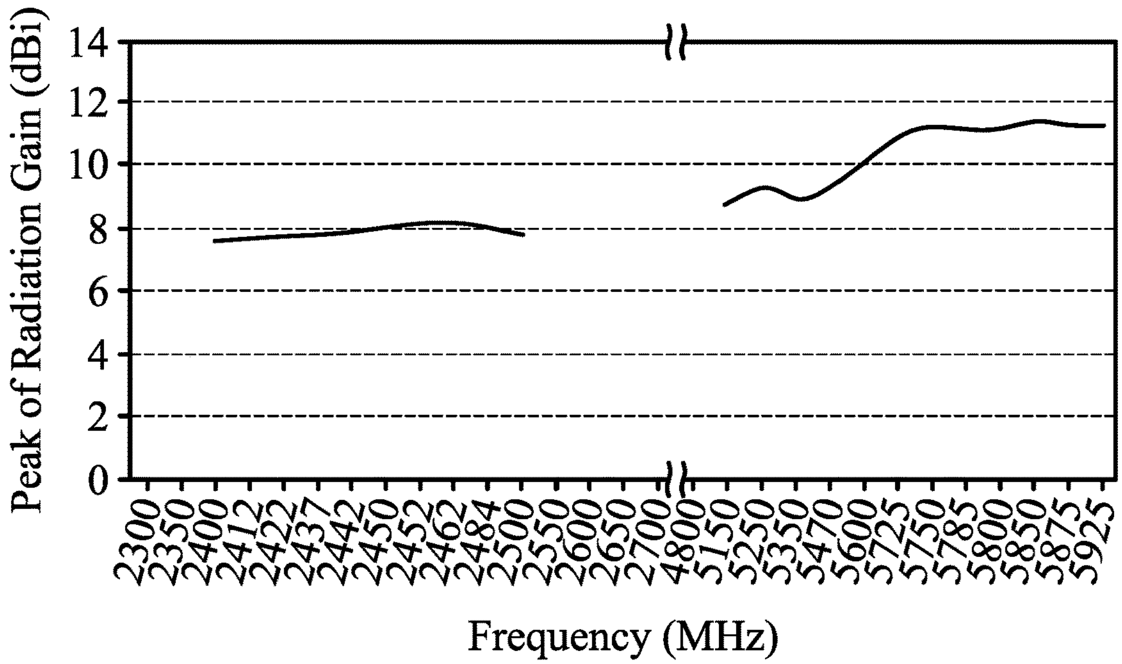
FIG. 5 is a diagram of radiation gain of an antenna system according to an embodiment of the invention.

FIG. 5 is a diagram of radiation gain of the antenna system 300 according to an embodiment of the invention. The horizontal axis represents the operational frequency (MHz), and the vertical axis represents the peak of radiation gain (dBi). According to the measurement of FIG. 5, the peak of radiation gain of the antenna system 300 can reach about 8 dBi within the aforementioned first frequency band FB1, and the peak of radiation gain of the antenna system 300 can reach about 11 dBi within the aforementioned second frequency band FB2. Therefore, the incorporation of the third antenna element 143 and the fourth antenna element 144 can help to significantly increase the radiation gain of the antenna system 300.

Figure 6:
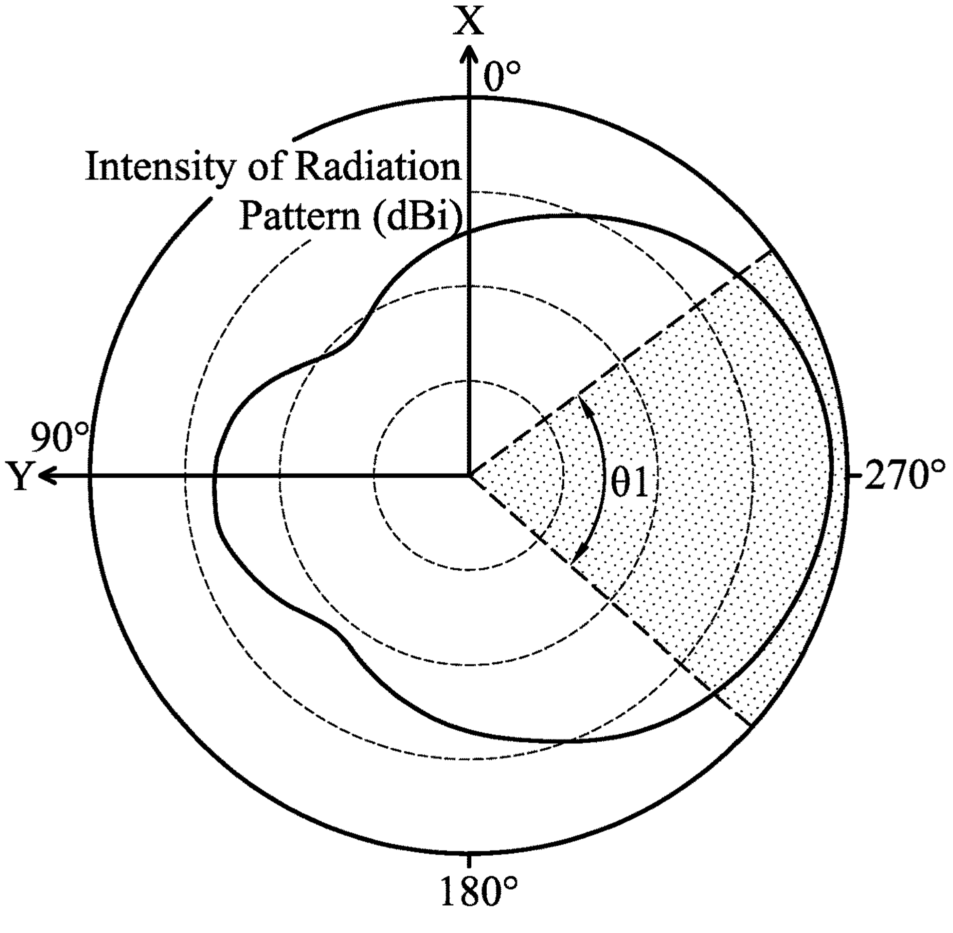
FIG. 6 is a radiation pattern of an antenna system according to an embodiment of the invention.

FIG. 6 is a radiation pattern of the antenna system 300 according to an embodiment of the invention (which may be measured along the XY-plane). According to the measurement of FIG. 6, the 3 dB-beamwidth θ1 of the antenna system 300 can reach about 76 degrees, and it can meet the requirements of practical applications of general communication devices. Other features of the antenna system 300 of FIG. 3 are similar to those of the antenna system 100 of FIG. 1A, FIG. 1B, FIG. 1C, and FIG. 1D. Accordingly, the two embodiments can achieve similar levels of performance.

Figure 7:
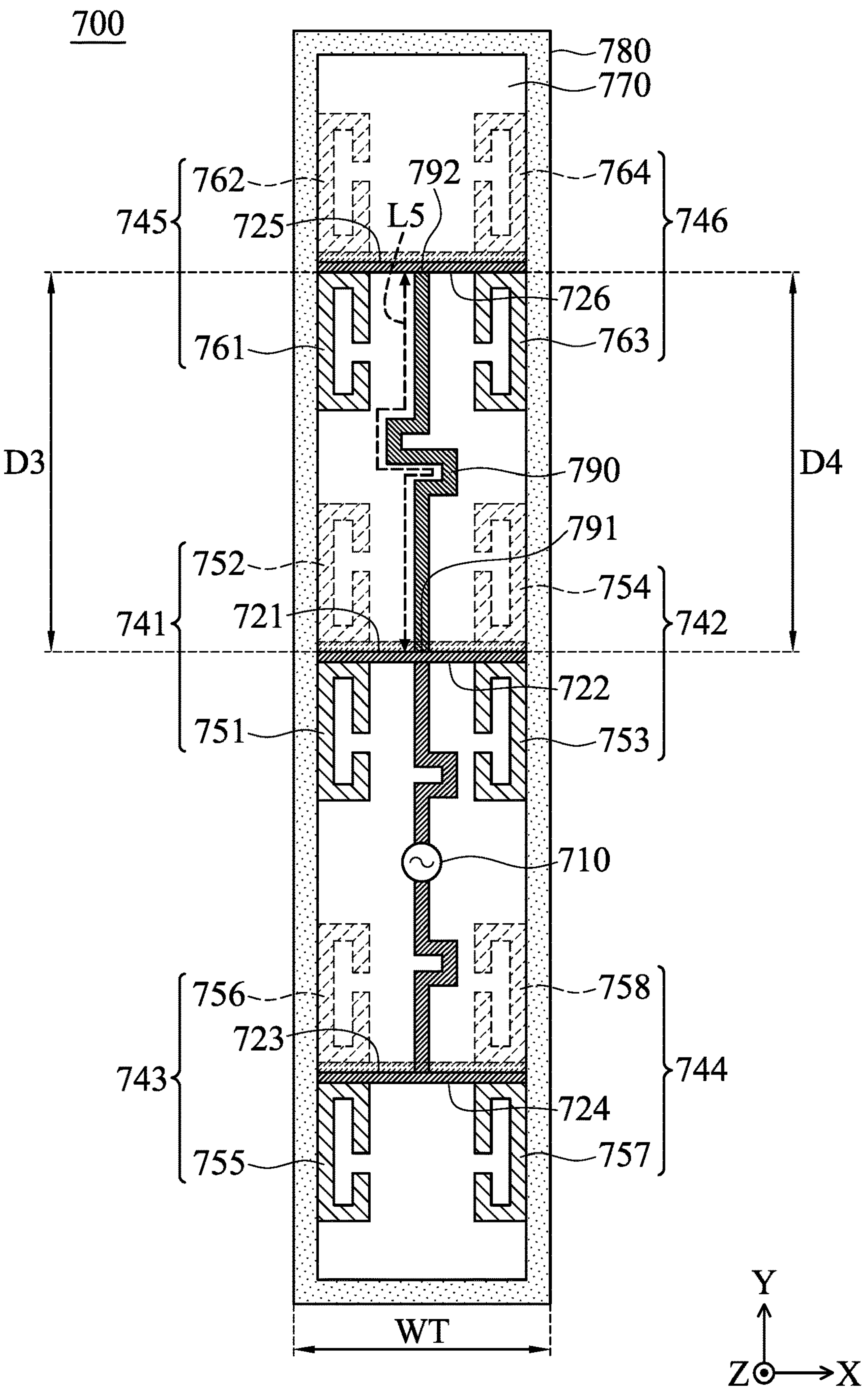
FIG. 7 is a front view of an antenna system according to an embodiment of the invention.

FIG. 7 is a front view of an antenna system 700 according to an embodiment of the invention. FIG. 7 is similar to FIG. 1A, FIG. 1B, FIG. 1C, and FIG. 1D. In the embodiment of FIG. 7, the antenna system 700 includes a signal feeding element 710, a first transmission line 721, a second transmission line 722, a third transmission line 723, a fourth transmission line 724, a fifth transmission line 725, a sixth transmission line 726, a first antenna element 741, a second antenna element 742, a third antenna element 743, a fourth antenna element 744, a fifth antenna element 745, a sixth antenna element 746, a dielectric substrate 770, a reflective plane 780, and a connection transmission line 790. It should be understood that in comparison to the previous embodiments, the shapes of each antenna element and each transmission line of the antenna system 700 are slightly adjusted, but the operational performance thereof is not negatively affected. In some embodiments, the signal feeding element 710 of the antenna system 700 further has an impedance adjustment design, but it is not limited thereto.

The first antenna element 741 is coupled through the first transmission line 721 to the signal feeding element 710. The first antenna element 741 includes a first radiation element 751 and a second radiation element 752. The second antenna element 742 is coupled through the second transmission line 722 to the signal feeding element 710. The second antenna element 742 includes a third radiation element 753 and a fourth radiation element 754. The third antenna element 743 is coupled through the third transmission line 723 to a signal feeding element 710. The third antenna element 743 includes a fifth radiation element 755 and a sixth radiation element 756. The fourth antenna element 744 is coupled through the fourth transmission line 724 to the signal feeding element 710. The fourth antenna element 744 includes a seventh radiation element 757 and an eighth radiation element 758.

The connection transmission line 790 may substantially have a meandering shape. The connection transmission line 790 has a first end 791 and a second end 792. The first end 791 of the connection transmission line 790 is coupled to the signal feeding element 710. The fifth transmission line 725 may be substantially parallel to the first transmission line 721. The fifth antenna element 745 is coupled through the fifth transmission line 725 to the second end 792 of the connection transmission line 790. The fifth antenna element 745 includes a ninth radiation element 761 and a tenth radiation element 762. In some embodiments, the first antenna element 741, the third antenna element 743, and the fifth antenna element 745 are substantially arranged in the same straight line, and the first antenna element 741 is disposed between the fifth antenna element 745 and the third antenna element 743. The sixth transmission line 726 may be substantially parallel to the second transmission line 722. The sixth antenna element 746 is coupled through the sixth transmission line 726 to the second end 792 of the connection transmission line 790. The sixth antenna element 746 includes an eleventh radiation element 763 and a twelfth radiation element 764. In some embodiments, the second antenna element 742, the fourth antenna element 744, and the sixth antenna element 746 are substantially arranged in another straight line, and the second antenna element 742 is disposed between the sixth antenna element 746 and the fourth antenna element 744.

A dielectric substrate 770 of the antenna system 700 has a first surface and a second surface which are opposite to each other. The first radiation element 751, the third radiation element 753, the fifth radiation element 755, the seventh radiation element 757, the ninth radiation element 761, and the eleventh radiation element 763 may all be disposed on the first surface of the dielectric substrate 770. The second radiation element 752, the fourth radiation element 754, the sixth radiation element 756, the eighth radiation element 758, the tenth radiation element 762, and the twelfth radiation element 764 may all be disposed on the second surface of the dielectric substrate 770. The reflective plane 780 are adjacent to the first antenna element 741, the second antenna element 742, the third antenna element 743, the fourth antenna element 744, the fifth antenna element 745, and the sixth radiation element 746.

Figure 8:
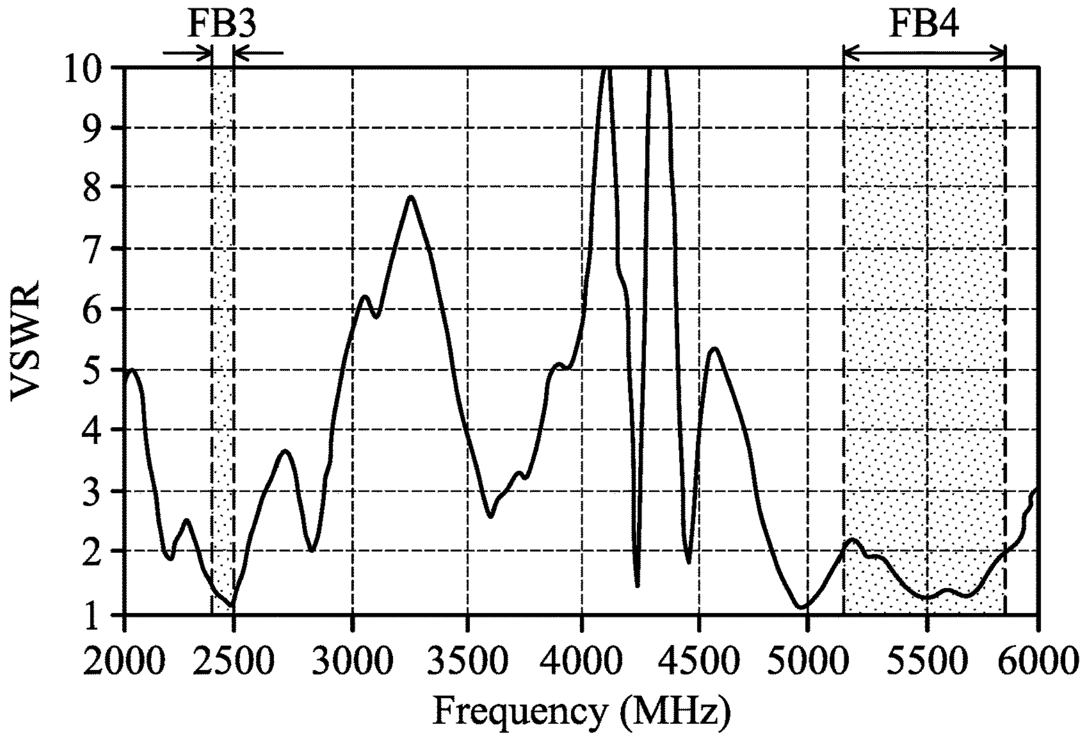
FIG. 8 is a diagram of VSWR of an antenna system according to an embodiment of the invention.

FIG. 8 is a diagram of VSWR of the antenna system 700 according to an embodiment of the invention. The horizontal axis represents the operational frequency (MHz), and the vertical axis represents the VSWR. According to the measurement of FIG. 8, the antenna system 700 can cover a first frequency band FB3 and a second frequency band FB4. For example, the first frequency band FB3 may be from 2400 MHz to 2500 MHz, and the second frequency band FB4 may be from 5150 MHz to 5850 MHz. Therefore, the antenna system 700 can support at least the wideband operations of WLAN 2.4 GHz/5 GHz. In some embodiments, a third distance D3 is defined between the fifth transmission line 725 and the first transmission line 721, and a fourth distance D4 is defined between the sixth transmission line 726 and the second transmission line 722. Each of the third distance D3 and the fourth distance D4 may be from 0.5 to 1 wavelength (λ/2~1λ) of the first frequency band FB3 of the antenna system 700. In addition, the length L5 of the connection transmission line 790 may be substantially equal to 0.5 wavelength (λ/2) of the first frequency band FB3 of the antenna system 700. Thus, the operational phases of the fifth antenna element 745 and the sixth antenna element 746 can be substantially the same as those of the first antenna element 741 and the second antenna element 742.

Figure 9:
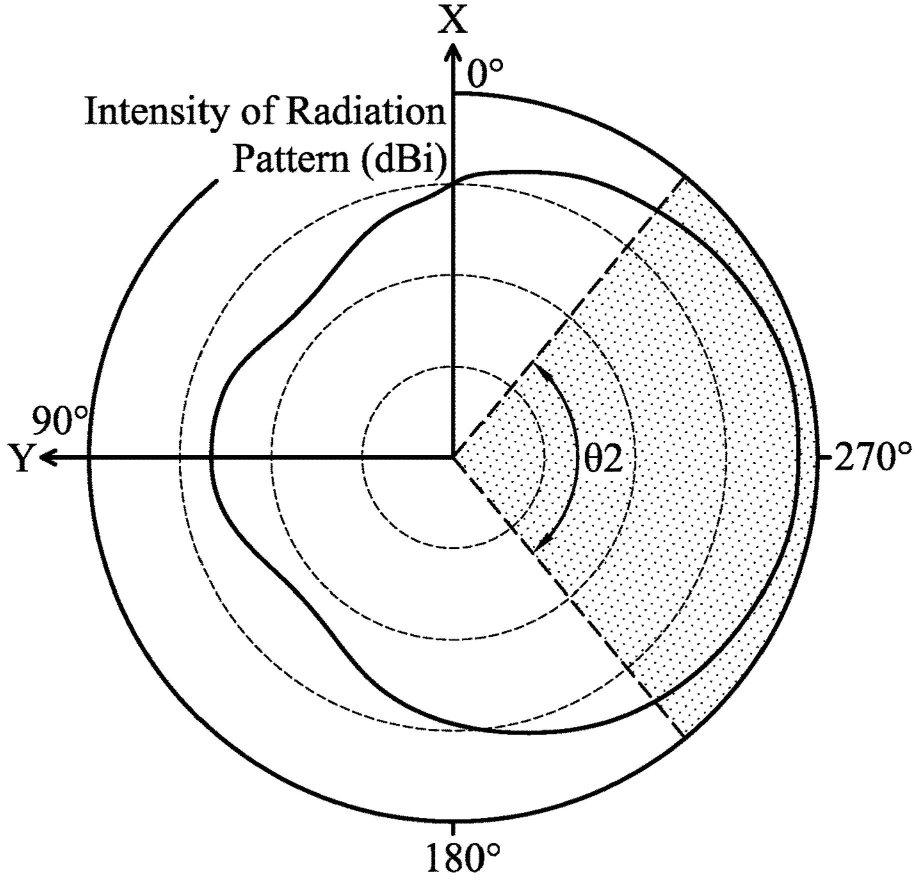
FIG. 9 is a radiation pattern of an antenna system according to an embodiment of the invention.

FIG. 9 is a radiation pattern of the antenna system 700 according to an embodiment of the invention (which may be measured along the XY-plane). According to the measurement of FIG. 9, the 3 dB-beamwidth θ2 of the antenna system 700 can reach about 101 degrees. Therefore, the incorporation of the fifth antenna element 745 and the sixth antenna element 746 can help to increase the beamwidth of the antenna system 700. Furthermore, according to practical measurements, such a design can also enhance the peak of radiation gain of the antenna system 700, and further reduce the overall width WT of the antenna system 700 (along the direction of X-axis). Other features of the antenna system 700 of FIG. 7 are similar to those of the antenna system 100 of FIG. 1A, FIG. 1B, FIG. 1C, and FIG. 1D. Accordingly, the two embodiments can achieve similar levels of performance.

The invention proposes a novel antenna system. In comparison to the conventional design, the invention has at least the advantages of relatively high radiation gain and relatively large beamwidth. Therefore, the invention is suitable for application in a variety of communication devices.

Note that the above element sizes, element shapes, and frequency ranges are not limitations of the invention. An antenna designer can fine-tune these settings or values in order to meet specific requirements. It should be understood that the antenna system of the invention is not limited to the configurations depicted in FIGS. 1-9. The invention may merely include any one or more features of any one or more embodiments of FIGS. 1-9. In other words, not all of the features displayed in the figures should be implemented in the antenna system of the invention.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna system, comprising:

a signal feeding element;

a first transmission line;

a second transmission line;

a first antenna element, coupled through the first transmission line to the signal feeding element, wherein the first antenna element comprises a first radiation element and a second radiation element;

a second antenna element, coupled through the second transmission line to the signal feeding element, wherein the second antenna element comprises a third radiation element and a fourth radiation element;

a reflective plane, wherein the reflective plane is adjacent to the first antenna element and the second antenna element; and a dielectric substrate, having a first surface and a second surface opposite to each other, wherein the first radiation element and the third radiation element are disposed on the first surface of the dielectric substrate, and the second radiation element and the fourth radiation element are disposed on the second surface of the dielectric substrate;

wherein each of the first radiation element, the second radiation element, the third radiation element, and the fourth radiation element comprises:

a main branch, having a first end and a second end;

a first branch, coupled to the first end of the main branch; and a second branch, coupled to the second end of the main branch, wherein a slot region is surrounded by the main branch, the first branch, and the second branch;

wherein the slot region comprises a narrow portion and a wide portion;

wherein a notch is formed between the first branch and the second branch, and the notch is connected to a junction point of the narrow portion and the wide portion of the slot region.

2. The antenna system as claimed in claim 1, wherein the first transmission line comprises a first widening segment, and the second transmission line comprises a second widening segment.

3. The antenna system as claimed in claim 2, wherein a length of each of the first widening segment and the second widening segment is from 5 mm to 8 mm.

4. The antenna system as claimed in claim 1, wherein the second radiation element is symmetrical to the first radiation element, and the fourth radiation element is symmetrical to the third radiation element.

5. The antenna system as claimed in claim 1, wherein the main branch substantially has a C-shape.

6. The antenna system as claimed in claim 1, wherein the slot region substantially has a straight-line shape.

7. The antenna system as claimed in claim 1, wherein the antenna system covers a first frequency band and a second frequency band, the first frequency band is from 2400 MHz to 2500 MHz, and the second frequency band is from 5150 MHz to 5850 MHz.

8. The antenna system as claimed in claim 7, wherein a length of the main branch is substantially equal to 0.25 wavelength of the first frequency band.

9. The antenna system as claimed in claim 7, wherein a length of the slot region is substantially equal to 0.5 wavelength of the second frequency band.

10. The antenna system as claimed in claim 7, wherein a total length of the first transmission line and the second transmission line is substantially equal to 0.5 wavelength of the first frequency band.

11. The antenna system as claimed in claim 7, wherein a specific distance between the reflective plane and the dielectric substrate is shorter than 0.125 wavelength of the first frequency band.

12. The antenna system as claimed in claim 7, further comprising:

a third transmission line;

a fourth transmission line;

a third antenna element, coupled through the third transmission line to the signal feeding element, wherein the third antenna element comprises a fifth radiation element and a sixth radiation element; and a fourth antenna element, coupled through the fourth transmission line to the signal feeding element, wherein the fourth antenna element comprises a seventh radiation element and an eighth radiation element;

wherein the reflective plane is adjacent to the third antenna element and the fourth antenna element.

13. The antenna system as claimed in claim 12, wherein the third transmission line comprises a third widening segment, and the fourth transmission line comprises a fourth widening segment.

14. The antenna system as claimed in claim 12, wherein a first distance is defined between the third transmission line and the first transmission line, a second distance is defined between the fourth transmission line and the second transmission line, and each of the first distance and the second distance is from 0.5 to 0.75 wavelength of the first frequency band.

15. The antenna system as claimed in claim 12, further comprising:

a connection transmission line, coupled to the signal feeding element;

a fifth transmission line;

a sixth transmission line;

a fifth antenna element, coupled through the fifth transmission line to the connection transmission line, wherein the fifth antenna element comprises a ninth radiation element and a tenth radiation element; and a sixth antenna element, coupled through the sixth transmission line to the connection transmission line, wherein the sixth antenna element comprises an eleventh radiation element and a twelfth radiation element;

wherein the reflective plane is adjacent to the fifth antenna element and the sixth antenna element.

16. The antenna system as claimed in claim 15, wherein a third distance is defined between the fifth transmission line and the first transmission line, a fourth distance is defined between the sixth transmission line and the second transmission line, and each of the third distance and the fourth distance is from 0.5 to 1 wavelength of the first frequency band.

17. The antenna system as claimed in claim 15, wherein a length of the connection transmission line is substantially equal to 0.5 wavelength of the first frequency band.

18. An antenna system, comprising:

a signal feeding element;

a first transmission line;

a second transmission line;

a first antenna element, coupled through the first transmission line to the signal feeding element, wherein the first antenna element comprises a first radiation element and a second radiation element;

a second antenna element, coupled through the second transmission line to the signal feeding element, wherein the second antenna element comprises a third radiation element and a fourth radiation element; and a reflective plane, wherein the reflective plane is adjacent to the first antenna element and the second antenna element;

wherein each of the first radiation element, the second radiation element, the third radiation element, and the fourth radiation element comprises:

a main branch, having a first end and a second end;

a first branch, coupled to the first end of the main branch; and a second branch, coupled to the second end of the main branch, wherein a slot region is surrounded by the main branch, the first branch, and the second branch;

wherein the first transmission line comprises a first widening segment, and the second transmission line comprises a second widening segment;

wherein the slot region comprises a narrow portion and a wide portion;

wherein a notch is formed between the first branch and the second branch, and the notch is connected to a junction point of the narrow portion and the wide portion of the slot region.

19. An antenna system, comprising:

a signal feeding element;

a first transmission line;

a second transmission line;

a first antenna element, coupled through the first transmission line to the signal feeding element, wherein the first antenna element comprises a first radiation element and a second radiation element;

a second antenna element, coupled through the second transmission line to the signal feeding element, wherein the second antenna element comprises a third radiation element and a fourth radiation element;

a reflective plane, wherein the reflective plane is adjacent to the first antenna element and the second antenna element; and a dielectric substrate, having a first surface and a second surface opposite to each other, wherein the first radiation element and the third radiation element are disposed on the first surface of the dielectric substrate, and the second radiation element and the fourth radiation element are disposed on the second surface of the dielectric substrate;

wherein each of the first radiation element, the second radiation element, the third radiation element, and the fourth radiation element comprises:

a main branch, having a first end and a second end;

a first branch, coupled to the first end of the main branch; and a second branch, coupled to the second end of the main branch, wherein a slot region is surrounded by the main branch, the first branch, and the second branch;

wherein the antenna system further comprises:

a third transmission line;

a fourth transmission line;

a third antenna element, coupled through the third transmission line to the signal feeding element, wherein the third antenna element comprises a fifth radiation element and a sixth radiation element;

a fourth antenna element, coupled through the fourth transmission line to the signal feeding element, wherein the fourth antenna element comprises a seventh radiation element and an eighth radiation element, and wherein the reflective plane is adjacent to the third antenna element and the fourth antenna element;

a connection transmission line, coupled to the signal feeding element;

a fifth transmission line;

a sixth transmission line;

a fifth antenna element, coupled through the fifth transmission line to the connection transmission line, wherein the fifth antenna element comprises a ninth radiation element and a tenth radiation element; and a sixth antenna element, coupled through the sixth transmission line to the connection transmission line, wherein the sixth antenna element comprises an eleventh radiation element and a twelfth radiation element;

wherein the reflective plane is adjacent to the fifth antenna element and the sixth antenna element.

* * * * *